(12) United States Patent
Sutskover et al.

(10) Patent No.: US 10,154,435 B2
(45) Date of Patent: Dec. 11, 2018

(54) SYSTEMS, METHODS, AND DEVICES FOR COEXISTENCE OF HETEROGENEOUS BANDWIDTH COMMUNICATIONS

(71) Applicant: INTEL CORPORATION, Santa Clara, CA (US)

(72) Inventors: Ilan Sutskover, Hadera (IL); Minyoung Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 48 days.

(21) Appl. No.: 15/283,307

(22) Filed: Oct. 1, 2016

(65) Prior Publication Data

US 2018/0098244 A1 Apr. 5, 2018

(51) Int. Cl.
*H04W 28/06* (2009.01)
*H04L 5/00* (2006.01)

(52) U.S. Cl.
CPC ......... *H04W 28/065* (2013.01); *H04L 5/0044* (2013.01)

(58) Field of Classification Search
None
See application file for complete search history.

(56) References Cited

U.S. PATENT DOCUMENTS

| | | | |
|---|---|---|---|
| 2011/0274040 A1* | 11/2011 | Pani | H04W 4/005 370/328 |
| 2014/0269667 A1* | 9/2014 | Teague | H04W 56/0065 370/350 |
| 2016/0165607 A1* | 6/2016 | Hedayat | H04W 72/0453 370/338 |
| 2016/0183243 A1* | 6/2016 | Park | H04W 72/0413 370/329 |
| 2016/0316374 A1* | 10/2016 | Xu | H04W 4/005 |
| 2017/0135110 A1* | 5/2017 | Rajakarunanayake | H04W 72/0453 |
| 2017/0272976 A1* | 9/2017 | Yang | H04W 28/065 |

* cited by examiner

*Primary Examiner* — Chirag G Shah
*Assistant Examiner* — Srinivasa R Reddivalam

(57) ABSTRACT

Communication devices and techniques for facilitating coexistence between networks operating at different bandwidths are described. In one embodiment, for example, an apparatus may include at least one memory and logic for a narrowband communication device, at least a portion of the logic comprised in hardware coupled to the at least one memory and the at least one wireless transmitter, the logic to determine a wideband preamble, determine a narrowband packet comprising a narrowband preamble and a narrowband packet data portion, and generate a binary-preamble packet comprising the wideband preamble and the narrowband packet. Other embodiments are described and claimed.

22 Claims, 12 Drawing Sheets

SYSTEMS, METHODS, AND DEVICES FOR COEXISTENCE OF HETEROGENEOUS BANDWIDTH COMMUNICATIONS

TECHNICAL FIELD

Embodiments herein generally relate to communications in wireless communications networks.

BACKGROUND

Wireless networks that support communication with smart phones, tablet computing devices, and computers (for instance, personal computers and laptops) typically operate in a bandwidth of about 20 megahertz (MHz). Such wireless networks include systems operating according to several of the Institute of Electrical and Electronics Engineers (IEEE) 802.11 standards. Operating within this bandwidth space requires devices having a transmit power of about 15 to 20 decibel-milliwatts (dBm).

Demand for smaller, low-power sensors and other similar devices has been increasing. For example, long range low power (LRLP) and other standards are being developed by to support "smart grid," Internet of Things (IoT), and digital health technologies. LRLP devices require lower power consumption rates due to limited resources, particularly power supply capacity. Accordingly, LRLP technologies are focused on narrowband technologies, for instance, operating at about 2 MHz or even the sub—1 MHz range. Conventional wireless networks and LRLP technologies may operate in overlapping coverage areas. However, conventional wireless devices and/or LRLP devices may only be capable of operating at one bandwidth, leading to data collisions and other sources of transmission interference.

DETAILED DESCRIPTION

Figure 1:
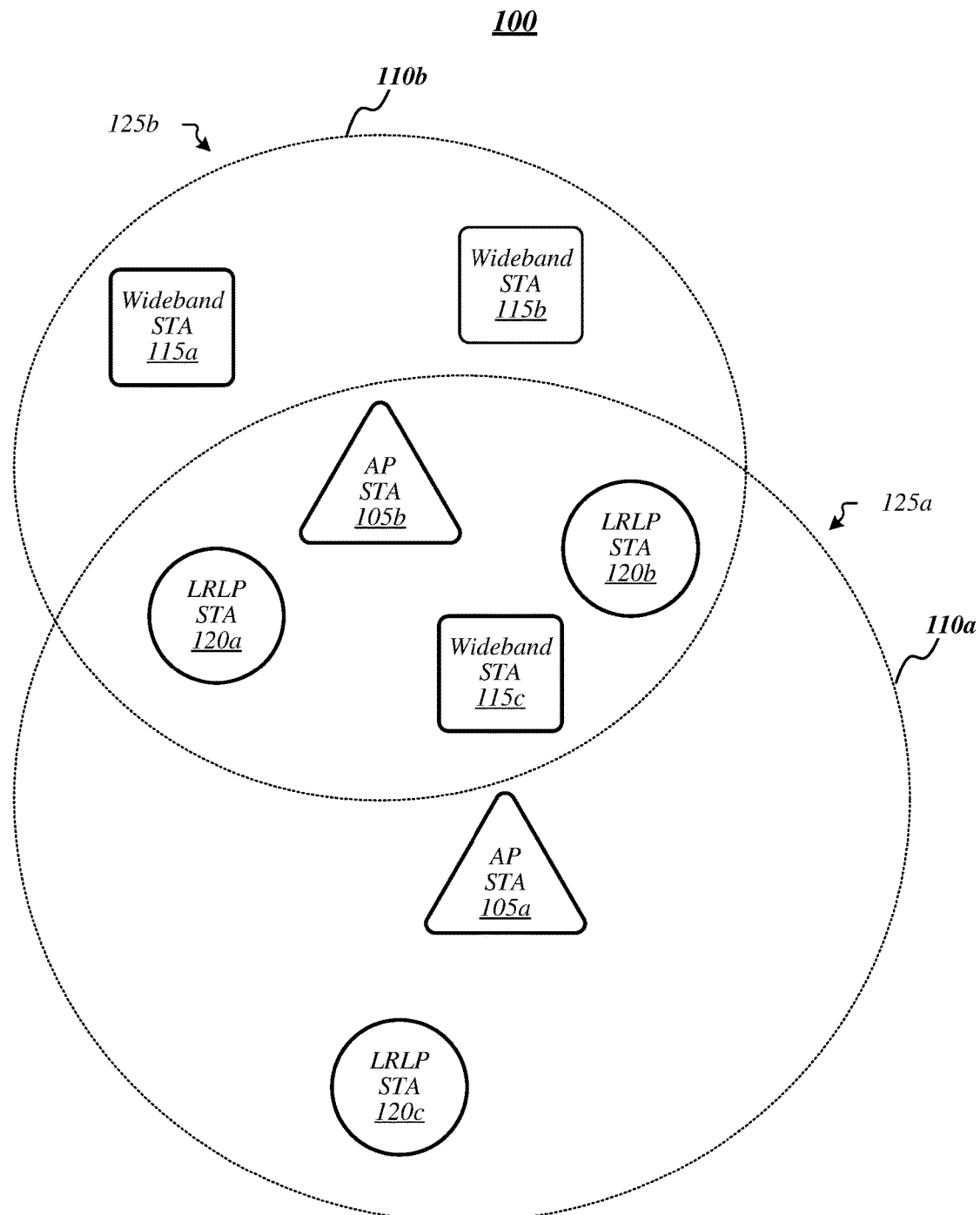
FIG. 1 illustrates an embodiment of a first operating environment.

Various embodiments may be generally directed to techniques for transmitting data packets within a wireless communications network. In one embodiment, for example, an apparatus may include at least one memory and logic for a narrowband communication device, at least a portion of the logic comprised in hardware coupled to the at least one memory and the at least one wireless transmitter, the logic to determine a wideband preamble, determine a narrowband packet comprising a narrowband preamble and a narrowband packet data portion, and generate a binary-preamble packet comprising the wideband preamble and the narrowband packet.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more narrowband wireless technologies. For example, various embodiments may include wireless communications according to the "Long Range Low Power" interest group (TIG) in Institute of Electrical and Electronics Engineers (IEEE) 802.11 (LRLP). The LRLP technology specifications are undergoing development. Accordingly, reference herein to LRLP and/or LRLP components includes current specifications and those developed in the future that are applicable to various embodiments (including, without limitation, existing and/or future IEEE LRLP standards and any developments, revisions, and/or the like thereto). Although LRLP technologies are used in example embodiments in this Detailed Description, embodiments are not so limited, as any narrowband wireless technology capable of operating according to some embodiments are contemplated herein. In general, bandwidth may refer to a communication channel width. In some embodiments, the narrowband or narrow bandwidth signals may include signals of less than about 20 MHz, about 16 MHz, about 12 MHz, about 10 MHz, about 8 MHz, about 5 MHz, about 4 MHz, about 3 MHz, about 2 MHz, about 1.5 MHz, about 1 MHz, less than about 1 MHz, about 0.5 MHz, ultra-low or ultra-narrow bandwidths, and any value or range between any two of these values (including endpoints). In some embodiments, a narrowband signal may be about 2 MHz. In some embodiments, a narrowband signal may be less than about 2 MHz. In some embodiments, a narrowband signal may be less than about 1 MHz. In some embodiments, a narrowband signal may be the same as or substantially the same as the bandwidth requirements of existing and/or future IEEE LRLP standards and any developments, revisions, and/or the like thereto. The embodiments are not limited in this context.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11ah, and/or IEEE 802.11ax standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, 3GPP TS 23.682, and/or 3GPP TS 30.300, and/or near-field communication (NFC) standards such as standards developed by the NFC Forum, including any predecessors, revisions, progeny, and/or variants of any of the above. The embodiments are not limited to these examples.

For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their predecessors, revisions, progeny, and/or variants.

Examples of wireless mobile broadband technologies and/or standards may also include, without limitation, any of the IEEE 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 that may be representative of various embodiments. The operating environment 100 depicted in FIG. 1 may include a narrowband wireless communication network 125a having a narrowband coverage area 110a. The operating environment 100 depicted in FIG. 1 may include a wideband wireless communication network 125b having a wideband coverage area 110b. In some embodiments, the narrowband wireless network 125a may operate using packets, frames, and/or other signals having a narrowband bandwidth. In general, bandwidth may refer to a communication channel width. In some embodiments, the narrowband wireless network 125a may include or may substantially include a LRLP network. In various embodiments, the wideband wireless network 125b may operate using packets, frames, and/or other signals having a wideband bandwidth. The wideband bandwidth may generally include a bandwidth that is larger than the narrowband bandwidth. In some embodiments, the narrowband bandwidth may be about 2 MHz. In some embodiments, the wideband bandwidth may be about 20 MHz.

As shown in FIG. 1, the LRLP wireless network 125a may facilitate communications among and between various narrowband communication devices, such as LRLP devices (stations or STA) 120a-c. In various embodiments, the LRLP wireless network 125a may provide "smart grid," sensor, and/or Internet of Things (IOT) services. For example, some embodiments may provide sensors to meter the usage of electricity, water, gas, and/or other utilities for a home or homes within a particular area and wirelessly transmit the usage of these services to a meter substation. Further embodiments may utilize sensors for home healthcare, clinics, or hospitals for monitoring healthcare related events and vital signs for patients such as fall detection, pill bottle monitoring, weight monitoring, sleep apnea, blood sugar levels, heart rhythms, and/or the like. Embodiments designed for such services generally require much lower data rates and much lower (for instance, ultra-low) power consumption than devices provided in IEEE 802.11n/ac systems. In some embodiments, the narrowband STA 120a-c may transmit and/or receive communications in accordance with specific communications standards, such as LRLP and/or other narrowband communication techniques.

In various embodiments, the wideband wireless network 125b may include a "legacy" network, such as a network according to IEEE 802.11 standards (for example, IEEE 802.11g, 802.11n, and/or the like). The wideband wireless network 125b may facilitate communications among and between various wideband STA 115a-c. Wideband STA 115a-c may include, without limitation, a mobile device, a fixed device, a machine-to-machine (M2M) device, a personal digital assistant (PDA), a mobile computing device, a smart phone, a telephone, a digital telephone, a cellular telephone, user equipment (UE), eBook readers, a computer, a personal computer (PC), a desktop computer, a laptop computer, a notebook computer, a netbook computer, a handheld computer, a tablet computer (tablet computing device), a server, work station, a mini-computer, a main frame computer, consumer electronics, game devices, display, digital television, set top box, wireless access point, base station, node B, subscriber station, mobile subscriber center, radio network controller, router, hub, gateway, bridge, switch, machine, or any combination thereof. In some embodiments, wideband STA 115a-c may transmit and/or receive communications in accordance with specific communications standards, such as the IEEE 802.11 standards or other wideband communication techniques.

LRLP wireless network 125a may include an LRLP access point (AP) STA 105a. LRLP STA 120a-c may have a wireless connection to LRLP wireless network 125a through LRLP AP STA 105a. In some embodiments, LRLP STA 120a-c may have a wireless connection to other networks, including wideband wireless network 125b, the Internet, and/or the like, through LRLP AP STA 105a. In some embodiments, all or substantially all of the network traffic for LRLP wireless network 125a may be transmitted through LRLP AP STA 105a. In some embodiments, LRLP AP STA 105a may be capable of operating using narrowband communications. For example, the LRLP AP STA 105a may be capable of transmitting and/or receiving signals having a bandwidth of about 2 MHz. In some embodiments, LRLP AP STA 105a may be capable of operating using narrowband communications and wideband communications. For example, the LRLP AP STA 105a may be capable of transmitting and/or receiving signals having a bandwidth of about 2 MHz and about 20 MHz. In some embodiments, LRLP STA 120a-c may be capable of operating using narrowband communications. For example, LRLP STA 120a-c may be capable of transmitting and/or receiving signals having a bandwidth of about 2 MHz. In some embodiments, LRLP STA 120a-c may be capable of operating using narrowband communications and wideband communications. For example, LRLP STA 120a-c may be capable of transmitting and/or receiving signals having a bandwidth of about 2 MHz and about 20 MHz.

Wideband wireless network 125b may include a wideband AP STA 105a. Wideband STA 115a-c may have a wireless connection to wideband wireless network 125b through wideband AP STA 105b. In some embodiments, wideband STA 115a-c may have a wireless connection to other networks, including LRLP wireless network 125a, the Internet, and/or the like, through wideband AP STA 105b. In some embodiments, all or substantially all of the network traffic for wideband wireless network 125b may be transmitted through wideband AP STA 105b. In some embodiments, wideband AP STA 105b may be capable of operating using wideband communications. For example, wideband AP STA 105b may be capable of transmitting and/or receiving signals having a bandwidth of about 20 MHz. In some embodiments, wideband AP STA 105b may be capable of operating using wideband communications and narrowband communications. For example, wideband AP STA 105b may be capable of transmitting and/or receiving signals having a bandwidth of about 2 MHz and about 20 MHz. In some embodiments, wideband STA 115a-c may be capable of operating using wideband communications. For example, wideband STA 115a-c may be capable of transmitting and/or receiving signals having a bandwidth of about 20 MHz. In some embodiments, wideband STA 115a-c may be capable of operating using wideband communications and narrowband communications. For example, wideband STA 115a-c may be capable of transmitting and/or receiving signals having a bandwidth of about 2 MHz and about 20 MHz.

LRLP STA 120a-c may include low-power devices, sensors, and/or the like powered by limited power sources, such as batteries (for example, coin-cell batteries). Such power sources may have a maximum current limitation that is significantly lower than current consumption during transmission in contemporary wireless networks, such as wideband wireless network 120b. Achieving a low peak current limitation (as well as preserving battery life during high activity) requires the transmit power of LRLP STA 120a-c to be reduced in comparison to wideband STA 115a-c, for example, to a maximum of about 0-5 decibel-milliwatts (dBm) instead of the 15-20 dBm used by legacy wireless communication devices. Accordingly, to compensate for the range reduction due to the lower transmit power, narrowband packets may be used for LRLP communications. For example, narrowing the bandwidth from the 20 MHz used by wideband legacy networks to 20 MHz may be equivalent to about 10 dBm of transmit power from a performance perspective. In addition, use of lower bandwidth signals provides power efficiency for STA receiving narrowband signals. For instance, use of a narrow bandwidth allows the time domain component of a modem to operate at much slower clock speeds (or equivalents thereof), thus contributing significantly to power consumption of the receiver.

LRLP STA 120a-c and LRLP AP STA 105a may transmit data or otherwise communicate using packets or frames. The packet may include a preamble and data (for instance, a "payload") transmitted. The preamble may include certain information about the packet, such as the length of the packet, packet type, encoding information, and/or the like that allows a receiving STA to process or otherwise handle the packet. A LRLP STA 120a-c operating in the narrowband requires packets having a preamble that allows detection within the narrowband. Accordingly, packets used for communication within LRLP wireless network 125a may include a preamble formed of narrowband signals. Conversely, wideband STA 115a-c and wideband AP 105b may communicate using packets formed of wideband signals.

As shown in FIG. 1, coverage area 110a of LRLP wireless network 125a may overlap with coverage area 110b of wideband wireless network 125b. LRLP STA 120a and 120b and wideband STA 115c may be in an area where both narrowband packets and wideband packets are being transmitted. LRLP STA 120a-c operating within a narrowband bandwidth may encounter coexistence issues with legacy devices, such as wideband STA 115a-c. For example, narrowband packets transmitted by LRLP STA 120a-c and/or LRLP AP STA 105a may not be recognized by legacy devices, possibly overriding or otherwise interfering with the transmission and/or reception of data by legacy devices. Such coexistence issues may be heightened for legacy devices operating at high throughput which frequently listen and/or transmit data such that data collisions may materially affect performance.

Figure 2A:
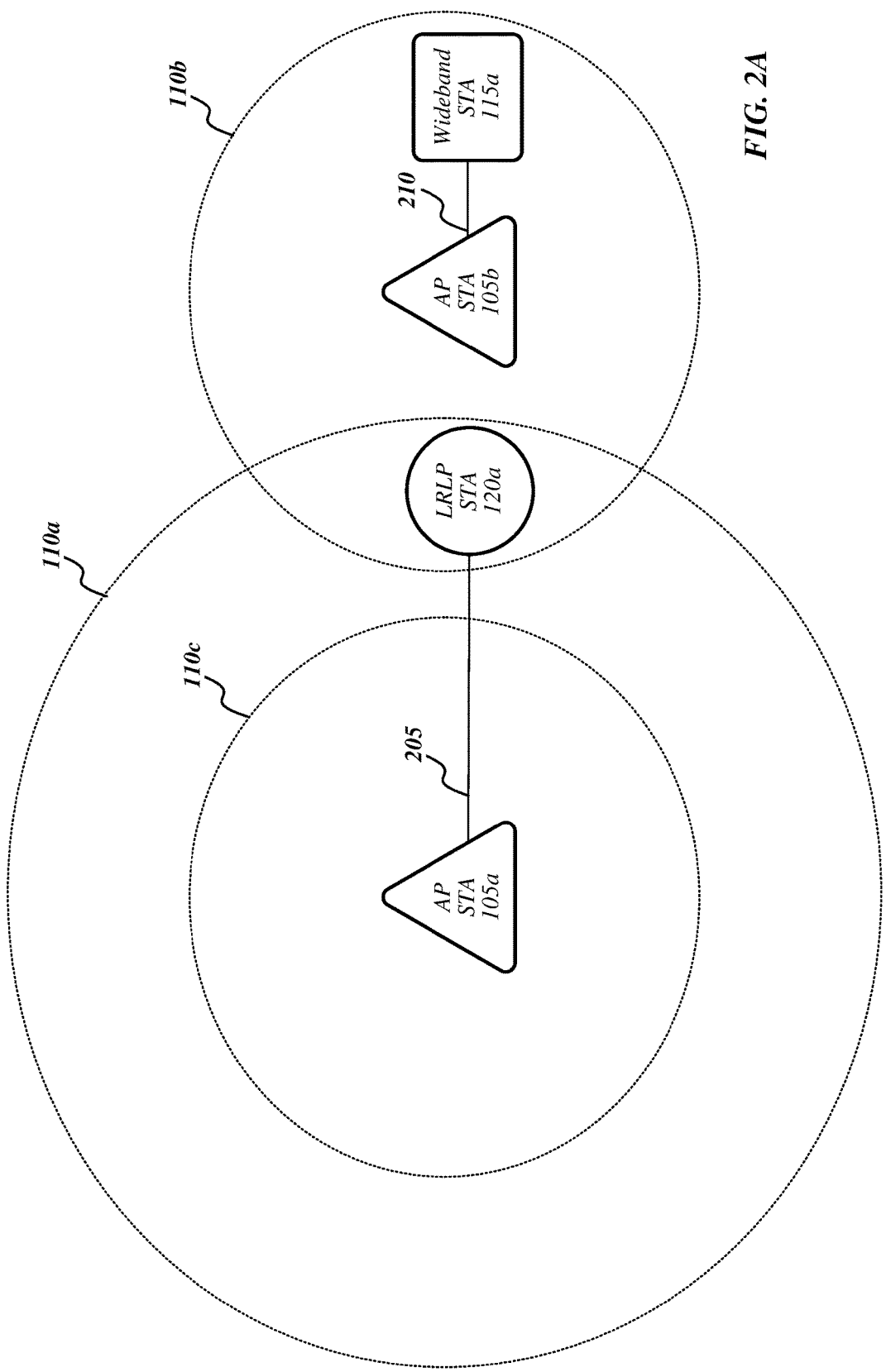
FIGS. 2A and 2B depict coexistence interference between a narrowband network and a wideband network.
Figure 2B:
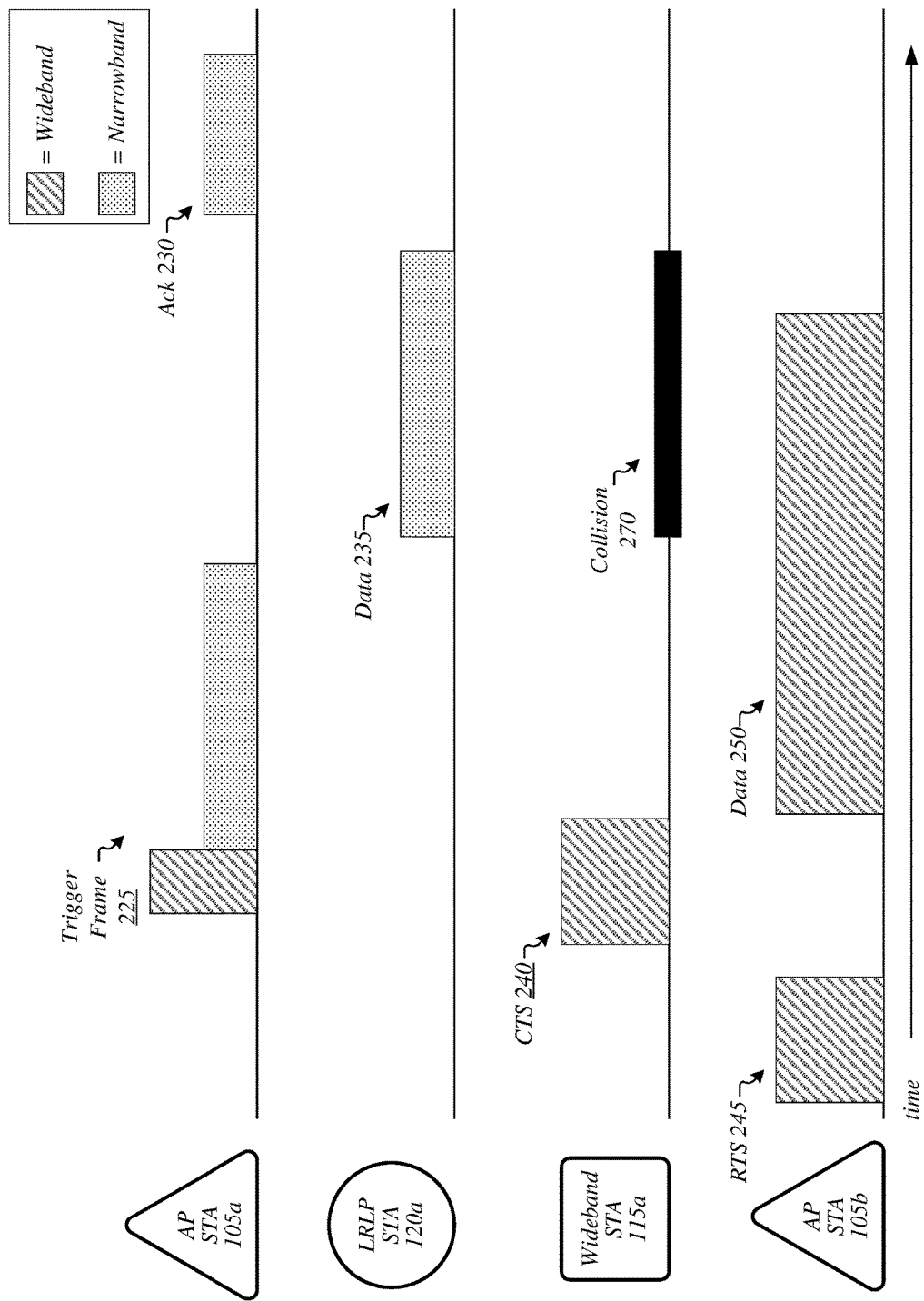

FIGS. 2A and 2B depict coexistence interference for a narrowband network (for example, a LRLP network) and a wideband network (for example, a legacy network). As shown in FIG. 2A, LRLP AP STA 105a may support both narrowband communications (for instance, about 2 MHz) and wideband communications (for instance, about 20 MHz) within coverage areas 110a and 110c, respectively. An LRLP link 205 may be formed between LRLP STA 120a and LRLP AP STA 105a using narrowband signals. A wideband link 210 may be for formed between wideband STA 115a and wideband AP STA 105b using wideband signals.

Referring to FIG. 2B, LRLP AP STA 105a may transmit a trigger frame 225 configured to control STA transmissions, for example, by specifying which STAs may transmit during a specified time. Wideband STA 115a is out of range of LRLP AP STA 105a and does not receive trigger frame 225. LRLP STA 120a transmits data 235 in a narrowband packet and LRLP AP STA 105a broadcasts an acknowledgment (Ack) frame 230.

Wideband AP STA 105b transmits a request to send (RTS) 245 frame and wideband STA 115a transmits a responsive clear to send (CTS) frame 240. LRLP STA 120a may receive CTS frame 240; however, the narrowband LRLP STA 120a cannot decode the wideband CTS frame 240 and, therefore, cannot set the network allocation vector (NAV). Accordingly, LRLP STA 120a cannot defer data transmission correctly. The wideband AP STA 105b transmits data 250 to wideband STA 115a. A transmission collision 270 occurs at the wideband STA 115a between data 235 and data 250.

As demonstrated in FIGS. 2A and 2B, transmission collisions and other interference events may occur between LRLP networks and legacy networks. Conventional and proposed standards do not adequately address such interference events. For example, current Wi-Fi standards do not have a packet type for which a preamble part is less than 20 MHz. In another example, IEEE 802.11ax allows for narrowband payload transmission and reception, but does not allow for detection other than a wideband preamble. Therefore, IEEE 802.11ax necessitates that a receiver (such as a low-power LRLP STA) listen for wideband signals until a signal is detected, requiring a higher clock rate and higher power consumption.

Accordingly, in some embodiments, a binary-preamble packet may be used to facilitate narrowband (for example, LRLP) communications that includes a wideband preamble, a narrowband preamble, and a data portion (or payload). The wideband preamble may be received and decoded by legacy devices, including STAs and APs, operating in the wideband space. The narrowband portions of the binary-preamble packet may be ignored by the legacy device. In this manner, legacy devices may receive information regarding narrowband packets being transmitted within reception range and may operate accordingly (for example, by deferring data transmission) to avoid transmission collisions.

Figure 3A:
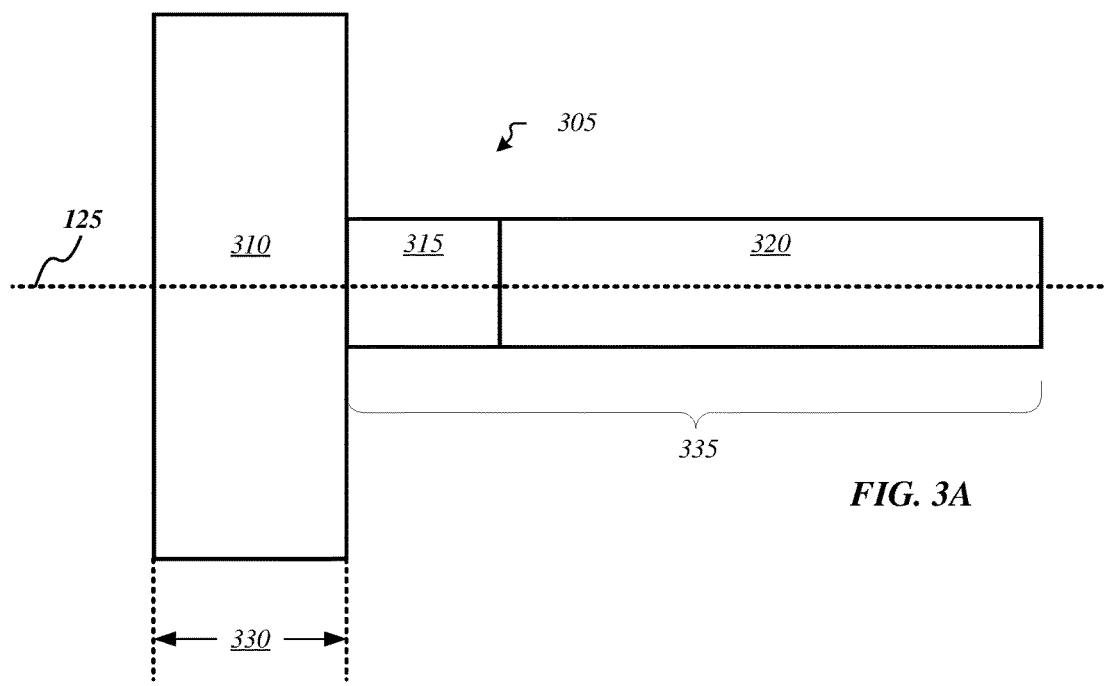
FIGS. 3A and 3B depict illustrative binary-preamble packets according to some embodiments.
Figure 3B:
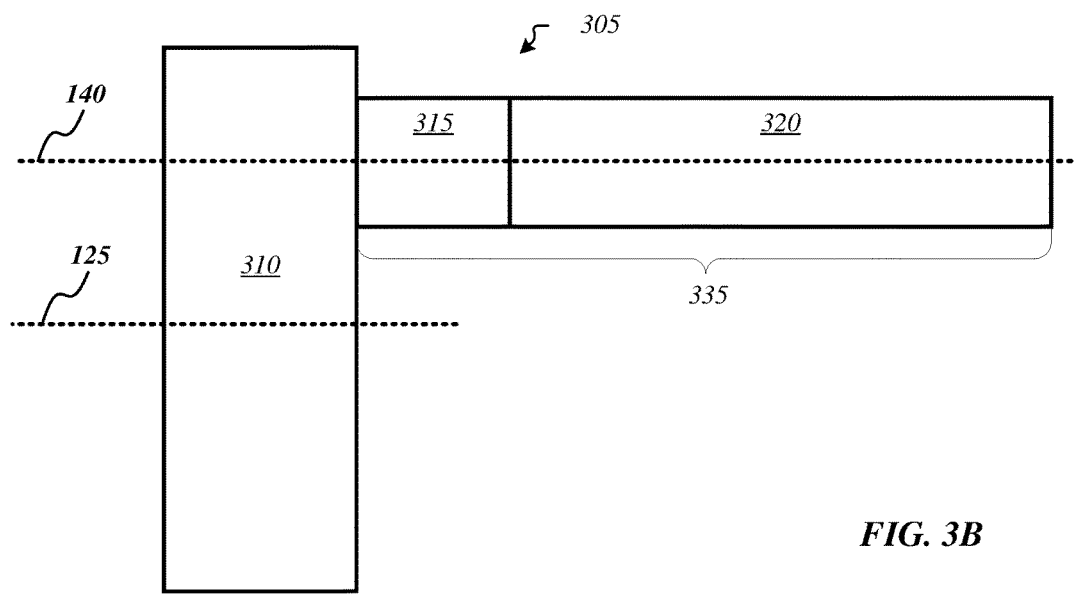

FIGS. 3A and 3B depict binary-preamble packets according to some embodiments. As shown in FIG. 3A, a binary-preamble packet 335 may include a wideband (or legacy) preamble 310 at a leading portion of the binary-preamble packet 335, followed by a narrowband preamble 315, and narrowband packet data 320. The narrowband preamble 315 and the narrowband packet data 320 may form a narrowband packet 335. In some embodiments, wideband preamble 310 may be transmitted at a wideband bandwidth, for example, 20 MHz or any other wideband bandwidth described herein. In various embodiments, wideband preamble 310 may be a legacy preamble compatible with IEEE 802.11 standards. In some embodiments, narrowband preamble 315 and the narrowband packet data 315 may be transmitted at a narrowband bandwidth, for example, about 2 MHz or any other narrowband bandwidth described herein. In various embodiments, narrowband preamble 315 and narrowband packet data 320 may be compatible with IEEE LRLP standards. In some embodiments, binary-preamble packet 335 may be an LRLP packet configured to operate within an LRLP wireless network (such as LRLP wireless network 125a).

In some embodiments, LRLP STA 120a-c and LRLP AP STA 105a may transmit binary-preamble packets 305 for communication with LRLP wireless network 125a. A wideband receiving device, such as wideband AP STA 105b and/or wideband STA 115a-c, may receive and decode the wideband preamble 310 and ignore the narrowband packet 335. A narrowband receiving device, such as LRLP STA 120a-c and LRLP AP STA 105a, may ignore the wideband preamble 310 and process the narrowband packet, for example, according to IEEE LRLP standards. A narrowband device receiver configured according to some embodiments may include detection processes looking for properties of the narrowband preamble 315, for example, to process the narrowband packet data 320 and/or to conduct reception with narrowband filters and low rate ADCs.

In some embodiments, wideband preamble 310 may signal legacy devices that a packet follows wideband preamble 310. In some embodiments, a legacy device may use information in wideband preamble 310 to, among other things, to determine packet information about the binary-preamble packet and/or the narrowband packet 335. In some embodiments, the packet information may be used to determine a length of the binary-preamble packet 335, the narrowband packet 335, or portions thereof. The legacy devices may operate based on the packet information, for example, deferring data transmission and/or reception during the length or transmission time of binary-preamble packet 335, narrowband packet 335, or portions thereof. The legacy device may not be configured to receive narrowband transmissions or may otherwise ignore narrowband preamble 315 and narrowband packet data 320. Narrowband preamble 315 may be used by narrowband devices, such as LRLP STA 120a-c and/or LRLP AP STA 105a, for various decoding operations, such as acquisition, automatic gain control (AGC), synchronization, channel estimation, and/or the like.

In some embodiments, wideband preamble 310 may have a short or relatively short duration 330. In various embodiments wideband preamble 310 may have a duration 330 of about 1 microseconds (µs), about 5 µs, about 10 µs, about 15 µs, about 20 µs, about 25 µs, about 30 µs, about 50 µs, about 100 µs, and any value or range between any two of these values (including endpoints). In some embodiments, wideband preamble 310 may have a duration 330 of about 20 µs. Accordingly, the higher power consumption required, for instance, due to a higher clock rate by a narrowband device to generate the wideband preamble 310 may be minimized due to the relatively short duration 330 of wideband preamble 310.

In some embodiments, wideband preamble 310 may include a packet preamble in accordance with IEEE 802.11 standards. In some embodiments, wideband preamble 310 may include an orthogonal frequency-division multiplexing (OFDM) preamble. In some embodiments, wideband preamble 310 may include narrowband packet information. Accordingly, legacy devices, such as wideband AP STA 105b and wideband STA 115a-c, may calculate a length of binary-preamble packet 335, narrowband packet 335, and/or portions thereof. In some embodiments, a legacy device may determine a length of binary-preamble packet 335, narrowband packet 335, and/or portions thereof based on modulation and coding scheme (MCS) and length fields of the signal field of wideband preamble 310, for example, configured as an IEEE 802.11 preamble (see, for example, FIG. 4). For example, a length of a transmitted LRLP packet may be determined by dividing a number of bits indicated in a length field (for instance, in octets) by the physical layer (PHY) rate (for instance, in megabits per second (Mbps)) of the MCS field. Such a determination of length of a LRLP packet may be unique to Wi-Fi LRLP standards and is not available in other narrowband and IOT technologies, such as Bluetooth® or Zigbee®.

As shown in FIG. 3A, wideband preamble 310, narrowband preamble 315, and/or narrowband packet data 320 may share a common center frequency 325. For example, transmission of binary-preamble packet 335 may include placing center frequency 325 at the middle of wide preamble 310 and practically wideband transmission of narrowband preamble 315 and narrowband packet data 320, in which the signal may be nulled where not needed.

Referring to FIG. 3B, in some embodiments, narrowband preamble 315 and/or narrowband packet data 320 may have a center frequency 340 that is different than the center frequency 325 of wideband preamble 310. For example, center frequency 340 may be placed in the middle of narrowband packet 335, and the bandwidth for wideband preamble 310 may be opened to wider than 20 MHz (for instance, in a legacy 20 MHz bandwidth wireless network). The transmission of binary-preamble packet 335 depicted in FIGS. 3A and 3B ultimately places the center frequency at the center of the narrowband transmission (for instance, narrowband packet 335). In some embodiments, the center frequency may be placed at alternative locations, for example, using different synthesizers for transmission (TX) and reception (RX) and/or changing the synthesizer frequency during such a transition. Embodiments are not limited in this context.

In some embodiments, the power of wide preamble 310 and narrowband packet 335 may be the same or substantially the same (for instance, due to low power requirements). Nonetheless, wideband preamble 310 may provide coexistence protection according to some embodiments. For example, if a narrowband device transmitted at about 0 dBm received with a power of about 40 dBm in the first 1 meter (m), and could go much lower at a higher distance. If a legacy device is capable of receiving Wi-Fi transmissions at about 93 dBm, and narrowband provides about 10 dB improvement to the signal-to-noise ratio (SNR) (for instance, due to a factor of 10 in bandwidth reduction), devices that receive a packet at a power above about 83 dBm may obtain coexistence protection of LRLP transmission; any other device with received power above 83 dBm should be able to detect a legacy wideband preamble.

Figure 4A:
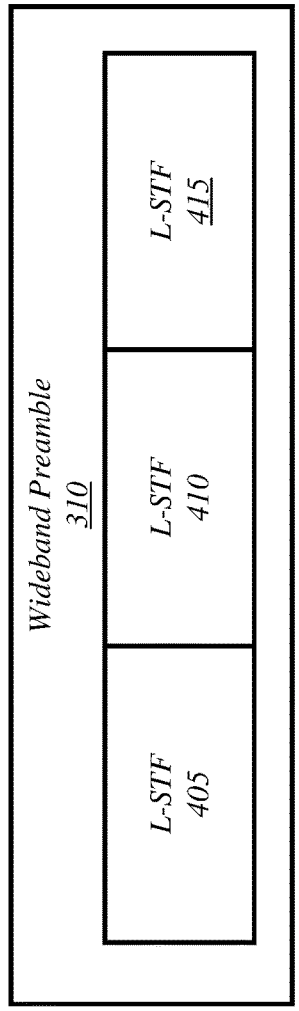
FIGS. 4A and 4B depict illustrative wideband preambles according to some embodiments.

FIG. 4A depicts an illustrative wideband preamble according to some embodiments. In various embodiments, wideband preamble 310 may be configured according to various legacy standards, such as IEEE 802.11 standards. For example, as shown in FIG. 4A, wideband preamble 310 may include a legacy short training field (L-STF) 405, a legacy long training field (L-LTF) 410, and/or a legacy signal field (L-SIG) 415. The length of L-STF 405 and L-LTF 410 fields may be fixed, while the value of a length field (see, for example, FIG. 4B) of L-SIG 415 may vary depending on, for example, the length of the packet (for instance, binary-preamble packet 310 and/or narrowband packet 305). In some embodiments, L-SIG 415 values for different lengths of packets (for instance, binary-preamble packet 310 and/or narrowband packet 305) may be prepared in advance. Accordingly, in various embodiments, the encoding of L-SIG 415 may be performed by a narrowband device (such as LRLP STA 120a-c and/or LRLP AP STA 105a) offline and time-domain patterns may be stored at the narrowband device for streaming. For example, the following Table 1 illustrates four different wideband preambles 310 prepared in advance by a narrowband device:

TABLE 1

| Packet Size Type | Rate Field | Length Field | Packet Length |
| --- | --- | --- | --- |
| Short Packet | 0 (for instance, 6 Mbps) | 375 octets | (375)*(8/6) = 0.5 milliseconds (ms) |
| Medium Packet | 0 (for instance, 6 Mbps) | 750 octets | (750)*(8/6) = 1 ms |
| Long Packet | 0 (for instance, 6 Mbps) | 1500 octets | (1500)*(8/6) = 2 ms |
| Extra-Long Packet | 0 (for instance, 6 Mbps) | 3000 octets | (3000)*(8/6) = 4 ms |

Figure 4B:
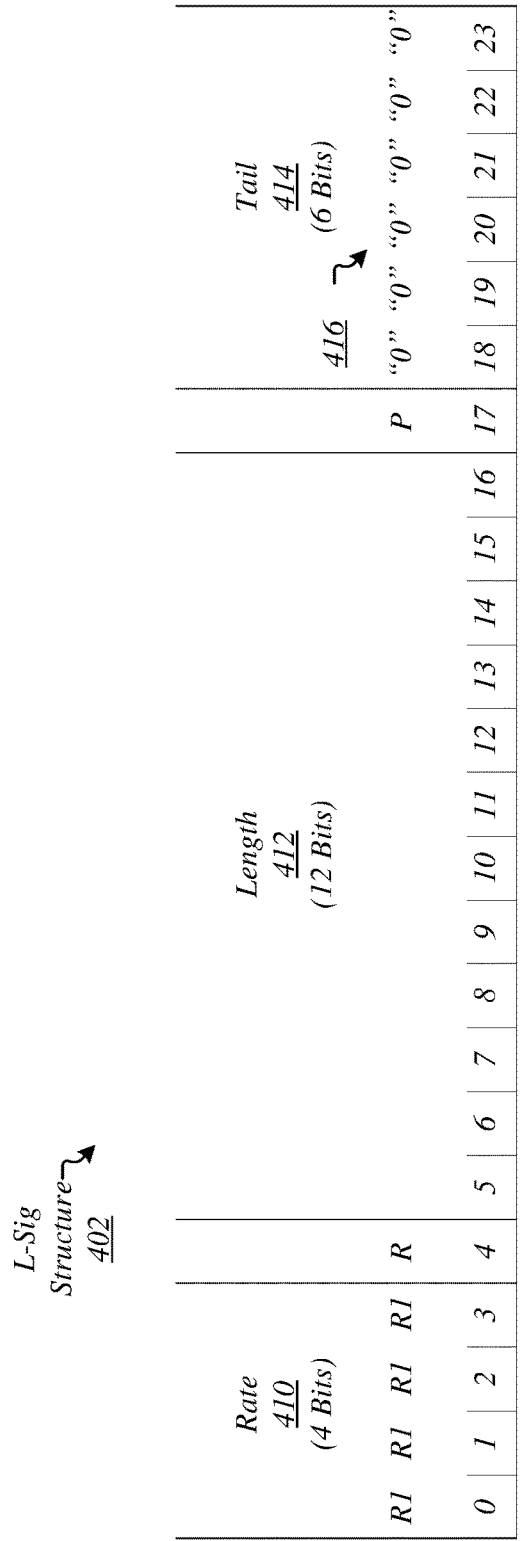

FIG. 4B depicts an illustrative L-SIG field of a wideband preamble according to some embodiments. As shown in FIG. 4A, an L-SIG structure 402 of a wideband preamble 310 may include a rate field 410, a length field 412, and a tail portion 414. In some embodiments, a packet may be padded with zeros 416, for example, when the actual packet length is shorter than a predefined packet length (for instance, as provided in Table 1).

Figure 5:
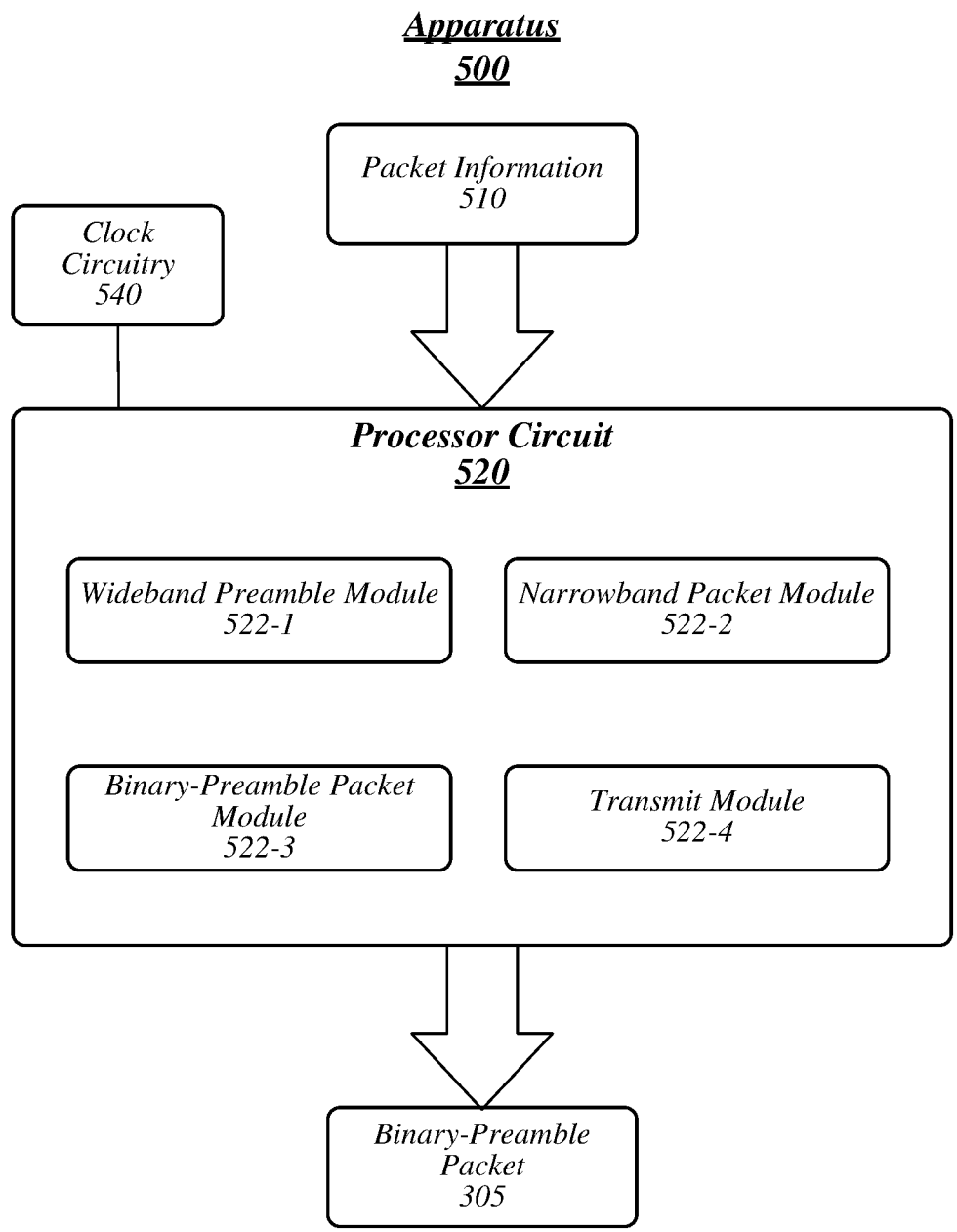
FIG. 5 depicts an illustrative narrowband apparatus according to some embodiments.

FIG. 5 illustrates a block diagram for a narrowband apparatus. As shown in FIG. 5, the narrowband apparatus includes an apparatus 500. Although apparatus 500 shown in FIG. 5 has a limited number of elements in a certain topology or configuration, it may be appreciated that apparatus 500 may include more or less elements in alternate configurations as desired for a given implementation.

The apparatus 500 may comprise a computer-implemented apparatus 500 having a processor circuit 520 arranged to execute one or more software modules 522-a. It is worthy to note that "a" and "b" and "c" and similar designators as used herein are intended to be variables representing any positive integer. Thus, for example, if an implementation sets a value for a=5, then a complete set of software modules 522-a may include modules 522-1, 522-2, 522-3, 522-4 and 522-5. The embodiments are not limited in this context.

In some embodiments, apparatus 500 may be part of a narrowband wireless device arranged to operate in compliance with one or more narrowband wireless technologies. For example, apparatus 500 may be arranged in or may be a part of a LRLP device, such as LRLP STA 120a-c or LRLP AP STA 105a.

As shown in FIG. 5, apparatus 500 may include a processor circuit 520. Processor circuit 520 may be generally arranged to execute one or more software modules 522-a. Processor circuit 520 can be any of various commercially available processors, for example, configured for LRLP devices, such as IOT devices, including, without limitation, Intel® Quark™ family of processors, AMD® Cortex® family of processors, a system on a chip (SoC), and/or the like. In some embodiments, modules 522-a and/or portions thereof may be implemented in software, hardware, and/or a combination thereof. For example, in various embodiments, modules 522-a and/or portions thereof may be implemented as hardware elements of processor circuit 520.

In some embodiments, apparatus 500 may receive or otherwise access packet information 510. Packet information 510 may include information, data, signals, and/or the like required to form binary-preamble packets 530 and/or portions thereof. For example, packet information 510 may include length information, symbol information (for instance, OFDM symbol information), encoding information, bandwidth information, packet data to be transmitted in a binary-preamble packet 335, and/or the like.

In some embodiments, apparatus 500 may include a wideband preamble module 522-1. Wideband preamble module 522-1 may be arranged for execution by processor circuit 520 to generate a wideband preamble for binary-preamble packets 530 being transmitted by the apparatus 500 (or a device that includes the apparatus 500). For example, wideband preamble module 522-1 may be configured to generate a wideband preamble 310, such as a legacy IEEE 802.11 standard preamble. In some embodiments, wideband preamble module 522-1 may be configured to encode wideband preambles prior to transmission of binary-preamble packets 335 requiring the wideband preamble. In some embodiments, the wideband preamble module 522-1 may access stored wideband preamble information, such as time-domain patterns as described in Table 1, to generate or otherwise provide a wideband preamble.

In various embodiments, wideband preamble module 522-1 may provide instructions or otherwise cause the clock circuitry 540 of the apparatus 500 (or the device that includes the apparatus 500) to increase bandwidth to generate the wideband preamble. For example, in some embodiments, the digital-to-analog converter (DAC) circuitry may be toggled or otherwise modified from a narrowband to a wideband (for instance, about 20 MHz) to generate the wideband preamble.

In some embodiments, apparatus 500 may include a narrowband packet module 522-2. Narrowband preamble module 522-1 may be arranged for execution by processor circuit 520 to generate LRLP packets, such as a narrowband packet 335 having a narrowband preamble 315 and narrowband packet data 320. In some embodiments, apparatus 500 may include a binary-preamble packet module 522-3.

Binary-preamble packet module 522-3 may be arranged for execution by processor circuit 520 to coordinate the transmission, formation, or other signal processing of a binary-preamble packet 335 that includes a wideband preamble, a narrowband preamble, and narrowband packet data. In various embodiments, apparatus 500 may include a transmit module 522-4. Transmit module 522-4 may be arranged for execution by processor circuit 520 to transmit binary-preamble packets 335 generate according to some embodiments through the wideband preamble module 522-1, narrowband packet module 522-2, and binary-preamble packet module 522-3.

Included herein is a set of logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 6:
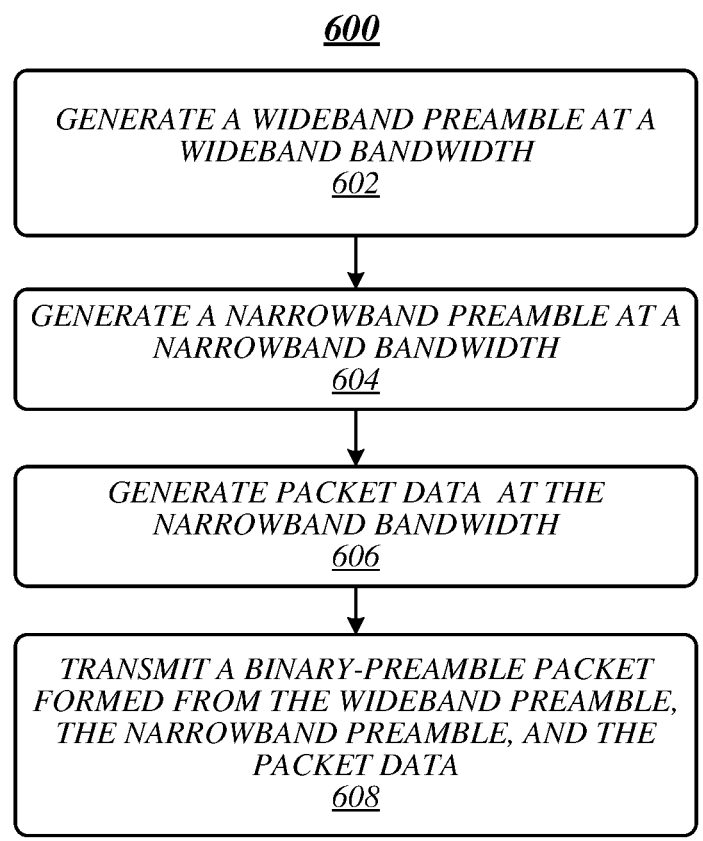
FIG. 6 illustrates an embodiment of a first logic flow.

FIG. 6 illustrates an embodiment of a logic flow 600. The logic flow 600 may be representative of some or all of the operations executed by one or more embodiments described herein, such as one of LRLP STA 120*a-c*, LRLP AP STA 105*a*, and/or apparatus 500.

In the illustrated embodiment shown in FIG. 6, the logic flow 600 at block 602 may generate a wideband preamble at a wideband bandwidth. For example, wideband preamble module 522-1 may generate a legacy wideband preamble at a wideband bandwidth according to IEEE 802.11 standards. In some embodiments, the wideband preamble may have a wideband bandwidth of about 20 MHz. In various embodiments, the wideband preamble may have L-STF, L-LTF, and L-SIG fields. In some embodiments, narrowband packet module 522-2 may cause a transmitting device to toggle a DAC to increase the clock to allow the transmitting device to generate a wideband preamble and return the DAC to narrowband operation after the wideband preamble has been generated.

At block 604, the logic flow 600 may generate a narrowband preamble at a narrowband bandwidth. For instance, narrowband packet module 522-2 may generate a narrowband preamble for an LRLP packet. In some embodiments, the narrowband packet may be formed at a narrowband bandwidth of about 2 MHz. In some embodiments, the narrowband packet may be formed at a narrowband bandwidth of about 2 MHz. Packet data may be generated at the narrowband bandwidth by the logic flow 600 at block 606. For instance, narrowband packet module 522-2 may generate narrowband packet data 320 based on packet information 510 received at apparatus 500.

At block 608, the logic flow 600 may transmit a binary-preamble packet formed from the wideband preamble, the narrowband preamble, and the packet data. For example, binary-packet module 522-3 may operate to form a binary-preamble packet 335 using wideband preamble 310, narrowband preamble 315, and narrowband packet data 320 and transmit module 522-4 may operate to transmit binary-preamble packet 335 within LRLP wireless network 125*a*.

Figure 7:
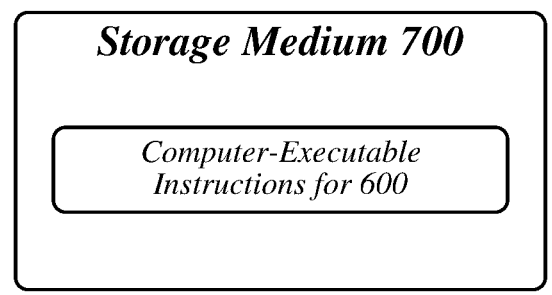
FIG. 7 illustrates an embodiment of a first storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
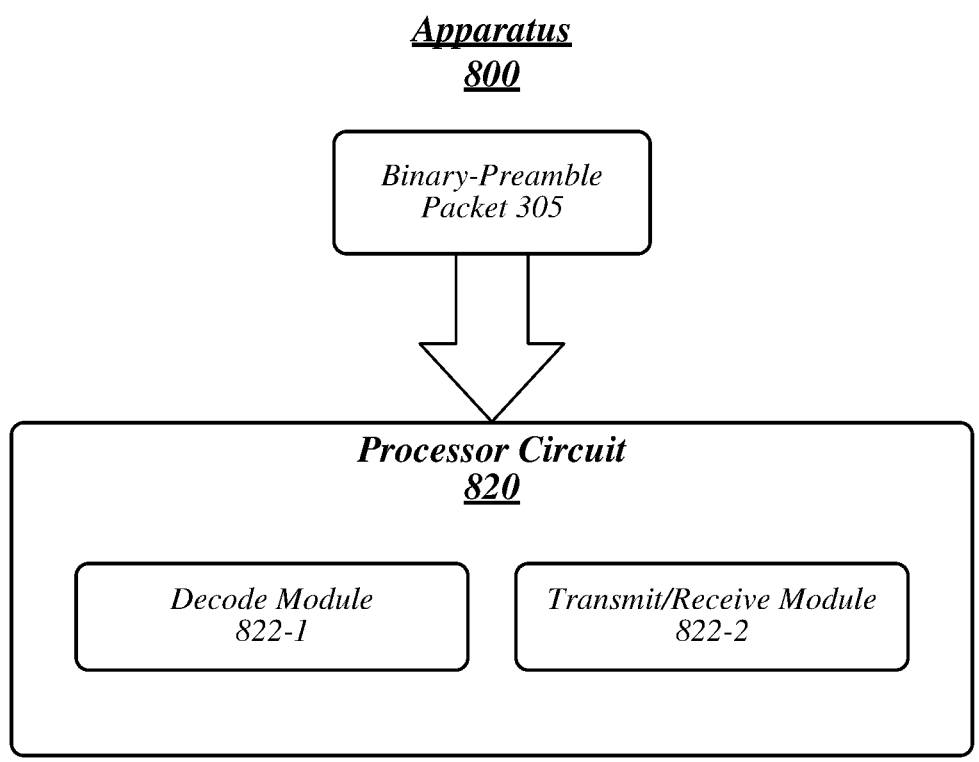
FIG. 8 depicts an illustrative wideband apparatus according to some embodiments.

FIG. 8 illustrates a block diagram for a wideband apparatus. As shown in FIG. 8, the narrowband apparatus includes an apparatus 800. Although apparatus 800 shown in FIG. 8 has a limited number of elements in a certain topology or configuration, it may be appreciated that apparatus 800 may include more or less elements in alternate configurations as desired for a given implementation.

Apparatus 800 may comprise a computer-implemented apparatus 800 having a processor circuit 820 arranged to execute one or more software modules 822-*a*. In some embodiments, apparatus 800 may be part of a wideband wireless device arranged to operate in compliance with one or more wideband wireless technologies. For example, apparatus 800 may be arranged in or may be a part of a wideband device, such as wideband STA 115*a-c* or wideband AP STA 105*a*.

As shown in FIG. 8, apparatus 800 may include a processor circuit 820. Processor circuit 820 may be generally arranged to execute one or more software modules 822-*a*. Processor circuit 820 can be any of various commercially available processors, for example, configured for wideband devices, such as mobile computing devices, computers, and/or the like, including, without limitation ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor circuit 820. According to some examples processor circuit 420 may also be an application specific integrated circuit (ASIC) and modules 822-*a* may be implemented as hardware elements of the ASIC.

In some embodiments, apparatus 800 may receive or otherwise access binary-preamble packets 305. The binary-preamble packets 305 may include a wideband preamble 310 followed by a narrowband packet 335 (for example, that includes a narrowband preamble 315 and narrowband packet data 320).

In some embodiments, apparatus 800 may include a decode module 822-1. Decode module 822-1 may be arranged for execution by processor circuit 820 to decode or otherwise process packets and/or portions thereof. In some embodiments, decode module 822-1 may be configured to process wideband transmissions, such as legacy IEEE 802.11 standard transmissions. In some embodiments, decode module 822-1 may be configured to process wideband transmissions, such as transmissions having a bandwidth of about 20 MHz. In some embodiments, decode module 822-1 may be configured to process a wideband preamble of a binary-preamble packet 335. For example, decode module 822-1 may operate to determine packet information regarding the binary-preamble packet 335 and/ or portions thereof, such as the narrowband packet 335. In some embodiments, the packet information may include a length of the binary-preamble.

In some embodiments, apparatus 800 may include a transmit/receive module 822-2. Transmit/Receive module 822-2 may be arranged for execution by processor circuit 820 to manage transmission and/or reception of data by apparatus 800 (or a device including apparatus 800). For example, transmit/receive module 822-2 may be configured to defer transmission of data by apparatus 800 (or a device including apparatus 800) during the length of a binary-preamble packet 335 received by apparatus and decoded by decode module 822-1.

Figure 9:
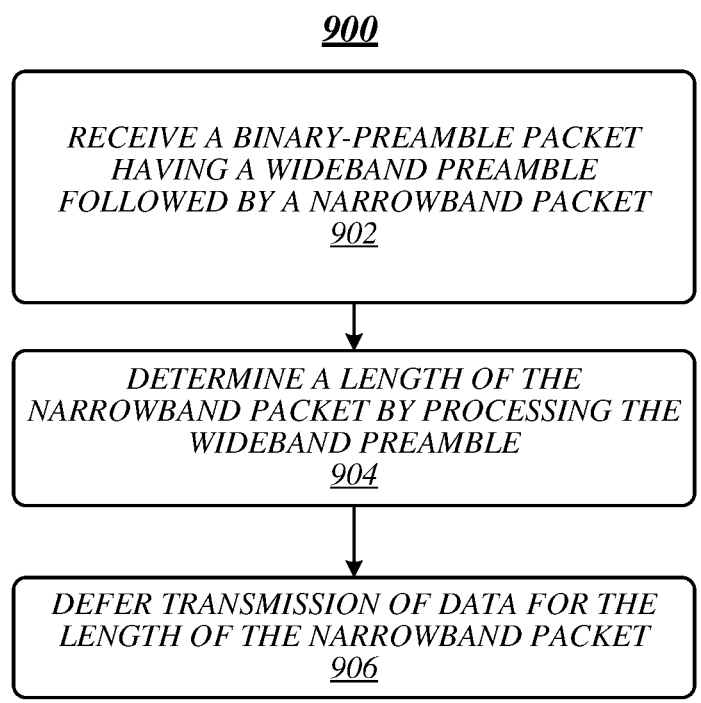
FIG. 9 illustrates an embodiment of a second logic flow.

FIG. 9 illustrates an embodiment of a logic flow 900. The logic flow 900 may be representative of some or all of the operations executed by one or more embodiments described herein, such as one of wideband STA 115a-c, wideband AP STA 105b, and/or apparatus 800.

In the illustrated embodiment shown in FIG. 9, the logic flow 900 at block 902 may receive a binary-preamble packet having a wideband preamble and a narrowband packet. For example, LRLP STA 120a may transmit a binary-preamble packet 335 that is received by wideband STA 115a. At block 904, the logic flow 900 may determine a length of the narrowband packet 335 of the binary-preamble packet 335 by processing the wideband preamble. For example, the decode module 822-1 may determine a length of a transmitted LRLP packet by dividing a number of bits indicated in a length field by the PHY rate of the MCS field. At block 906, the logic flow may defer transmission of data for the length of the narrowband packet. For example, transmit/ receive module 822-2 may defer transmission of a packet by apparatus 800 (or device including apparatus 800) for the duration of the narrowband packet 305 associated with the wideband preamble received by the apparatus.

Figure 10:
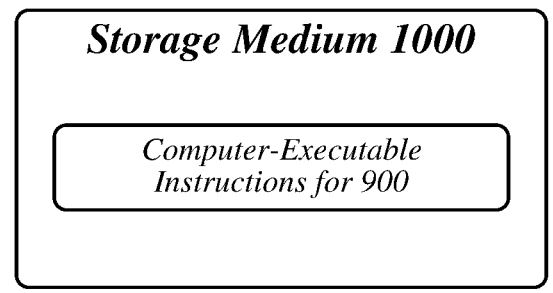
FIG. 10 illustrates an embodiment of a second storage medium.

FIG. 10 illustrates an embodiment of a storage medium 1000. Storage medium 1000 may comprise any non-transitory computer-readable storage medium or machine-readable storage medium according to some embodiments. In some embodiments, storage medium 1000 may store computer-executable instructions, such as computer-executable instructions to implement logic flow 900 of FIG. 9.

Figure 11:
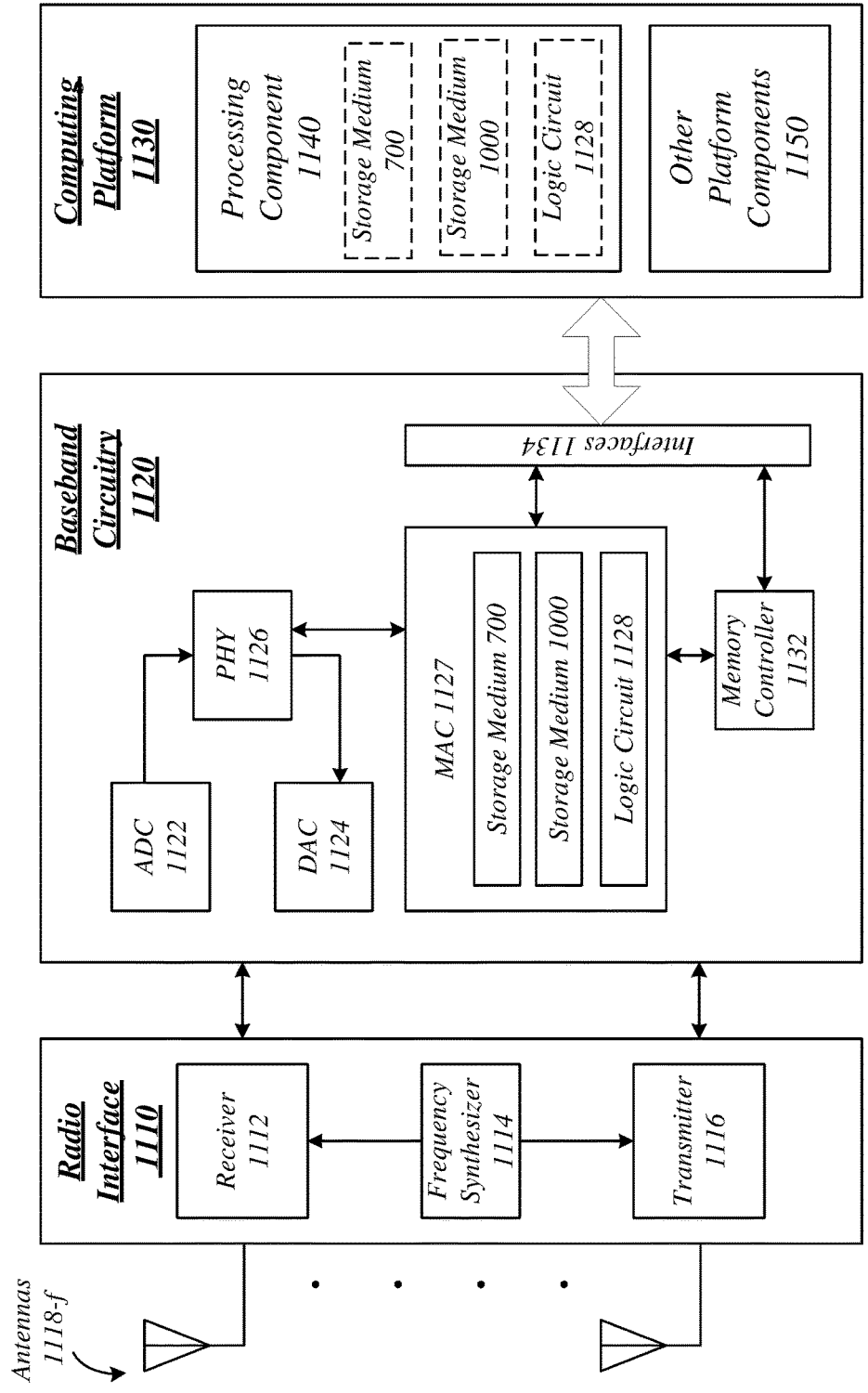
FIG. 11 illustrates an embodiment of a device.

FIG. 11 illustrates an embodiment of a communications device 1100 that may implement one or more of LRLP STA 120a-c, LRLP AP STA 105a, wideband STA 115a-c, wideband AP STA 105b, logic flow 600 of FIG. 6, logic flow 900 of FIG. 9, storage medium 700 of FIG. 7, and storage medium 1000 of FIG. 10. In various embodiments, device 1100 may comprise a logic circuit 1128. The logic circuit 1128 may include physical circuits to perform operations described for one or more of LRLP STA 120a-c, LRLP AP STA 105a, wideband STA 115a-c, wideband AP STA 105b, logic flow 600 of FIG. 6, logic flow 900 of FIG. 9, storage medium 700 of FIG. 7, and storage medium 1000 of FIG. 10, for example. As shown in FIG. 11, device 1100 may include a radio interface 1110, baseband circuitry 1120, and computing platform 1130, although the embodiments are not limited to this configuration.

The device 1100 may implement some or all of the structure and/or operations for one or more of LRLP STA 120a-c, LRLP AP STA 105a, wideband STA 115a-c, wideband AP STA 105b, logic flow 600 of FIG. 6, logic flow 900 of FIG. 9, storage medium 700 of FIG. 7, and storage medium 1000 of FIG. 10, and logic circuit 1128 in a single computing entity, such as entirely within a single device. Alternatively, the device 1100 may distribute portions of the structure and/or operations for one or more of LRLP STA 120a-c, LRLP AP STA 105a, wideband STA 115a-c, wideband AP STA 105b, logic flow 600 of FIG. 6, and logic flow 900 of FIG. 9, and logic circuit 1128 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1110 may include, for example, a receiver 1114, a frequency synthesizer 1114, and/or a transmitter 1116. Radio interface 1110 may include bias controls, a crystal oscillator and/or one or more antennas 1118-f. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, a mixer for down-converting received RF signals, an analog-to-digital converter 1122 for converting analog signals to digital form, a digital-to-analog converter 1124 for converting digital signals to analog form, and a mixer for up-converting signals for transmission. Further, baseband circuitry 1120 may include a baseband or physical layer (PHY) processing circuit 1126 for PHY link layer processing of respective receive/transmit signals. Baseband circuitry 1120 may include, for example, a medium access control (MAC) processing circuit 1127 for MAC/data link layer processing. Baseband circuitry 1120 may include a memory controller 1132 for communicating with MAC processing circuit 1127 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames. Alternatively or in addition, MAC processing circuit 1127 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for one or more of LRLP STA 120a-c, LRLP AP STA 105a, wideband STA 115a-c, wideband AP STA 105b, logic flow 600 of FIG. 6, and logic flow 900 of FIG. 9, and logic circuit 1128 using the processing component 1140. The processing component 1140 (and/or PHY 1126 and/or MAC 1127) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, a sensor, an IOT device, a LRLP device, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired.

Embodiments of device 1100 may be implemented using single input single output (SISO) architectures. However, certain implementations may include multiple antennas (e.g., antennas 1118-f) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising at least one memory and logic for a narrowband communication device, at least a portion of the logic comprised in hardware coupled to the at least one memory and the at least one wireless transmitter, the logic to determine a wideband preamble, determine a narrowband packet comprising a narrowband preamble and a narrowband packet data portion, and generate a binary-preamble packet comprising the wideband preamble and the narrowband packet.

Example 2 is the apparatus of Example 1, further comprising at least one radio frequency (RF) transceiver.

Example 3 is the apparatus of Example 2, the logic to transmit, via the at least one radio frequency (RF) transceiver, the binary-preamble packet.

Example 4 is the apparatus of Example 1, the narrowband communication device comprising at least one of a smart grid device, an Internet of Things (IOT) device, and a digital health sensor.

Example 5 is the apparatus of Example im 1, the narrowband communication device comprising a narrowband station.

Example 6 is the apparatus of Example 1, the narrowband communication device comprising a narrowband access point.

Example 7 is the apparatus of Example 1, the narrowband communication device comprising a long range low power (LRLP) device.

Example 8 is the apparatus of Example 1, the narrowband communication device comprising a long range low power (LRLP) access point.

Example 9 is the apparatus of Example 1, the wideband preamble having a designated wideband bandwidth.

Example 10 is the apparatus of Example 1, the wideband preamble having a designated wideband bandwidth corresponding to at least one Institute of Electrical and Electronics Engineers (IEEE) 802.11 standard.

Example 11 is the apparatus of Example 1, the wideband preamble having a designated wideband bandwidth corresponding to at least one of an Institute of Electrical and Electronics Engineers (IEEE) 802.11n standard, an IEEE 802.11g standard, an IEEE 802.11a standard, and an IEEE 802.11ac standard.

Example 12 is the apparatus of Example 1, the wideband preamble having a designated wideband bandwidth of about 20 MHz.

Example 13 is the apparatus of Example 1, the narrowband packet having a designated narrowband bandwidth.

Example 14 is the apparatus of Example 1, the narrowband packet having a designated narrowband bandwidth corresponding to a long range low power (LRLP) bandwidth.

Example 15 is the apparatus of Example 1, the narrowband packet having a designated narrowband bandwidth of about 2 MHz.

Example 16 is the apparatus of Example 1, the logic to generate the binary-preamble packet having the wideband preamble and the narrowband packet at a same center frequency.

Example 17 is the apparatus of Example 1, the logic to generate the binary-preamble packet having the wideband preamble and the narrowband packet at a different center frequency.

Example 18 is the apparatus of Example 1, the wideband preamble having a duration of about 20 μs.

Example 19 is the apparatus of Example 1, the wideband preamble having a duration of less than about 20 μs.

Example 20 is the apparatus of Example 1, the wideband preamble comprising a preamble corresponding to at least one Institute of Electrical and Electronics Engineers (IEEE) 802.11 standard.

Example 21 is the apparatus of Example 1, the wideband preamble comprising a preamble corresponding to at least one of an Institute of Electrical and Electronics Engineers (IEEE) 802.11n standard, an IEEE 802.11g standard, an IEEE 802.11a standard, and an IEEE 802.11ac standard.

Example 22 is the apparatus of Example 1, the wideband preamble having a legacy short training field (L-STF), a legacy long training field (L-LTF), and a legacy signal field (L-SIG).

Example 23 is the apparatus of Example 1, the wideband preamble comprising narrowband packet information.

Example 24 is the apparatus of Example 23, the narrowband packet information comprising information for determining a length of the narrowband packet.

Example 25 is the apparatus of Example 24, the narrowband packet information arranged within a length field and a modulation and code scheme (MCS) field of the wideband preamble.

Example 26 is the apparatus of Example 24, the logic to encode at least a portion of the wideband preamble offline.

Example 27 is the apparatus of Example 26, the logic to estimate a packet length of a wideband preamble based on a packet size type.

Example 28 is the apparatus of Example 1, comprising clock circuitry for generating signals for the binary-preamble packet.

Example 29 is the apparatus of Example 28, the logic to increase a clock rate of the clock circuitry to correspond to a wideband signal to generate the wideband preamble.

Example 30 is the apparatus of Example 28, the logic to operate the clock circuitry at a clock rate corresponding to a narrowband signal to generate the narrowband packet.

Example 31 is a system, comprising: an apparatus according to any of Examples 1 to 30, and at least one radio frequency (RF) transceiver.

Example 32 is a computer-readable storage medium that stores instructions for execution by processing circuitry of a narrowband communication device, the instructions to cause the narrowband communication device to determine a wideband preamble, determine a narrowband packet comprising a narrowband preamble and a narrowband packet data portion, and generate a binary-preamble packet comprising the wideband preamble and the narrowband packet.

Example 33 is the computer-readable storage medium of Example 32, the instructions to cause the narrowband communication device to transmit, via at least one radio frequency (RF) transceiver, the binary-preamble packet.

Example 34 is the computer-readable storage medium of Example 32, the narrowband communication device comprising at least one of a smart grid device, an Internet of Things (TOT) device, and a digital health sensor.

Example 35 is the computer-readable storage medium of Example 32, the narrowband communication device comprising a narrowband station.

Example 36 is the computer-readable storage medium of Example 32, the narrowband communication device comprising a narrowband access point.

Example 37 is the computer-readable storage medium of Example 32, the narrowband communication device comprising a long range low power (LRLP) device.

Example 38 is the computer-readable storage medium of Example 32, the narrowband communication device comprising a long range low power (LRLP) access point.

Example 39 is the computer-readable storage medium of Example 32, the wideband preamble having a designated wideband bandwidth.

Example 40 is the computer-readable storage medium of Example 32, the wideband preamble having a designated wideband bandwidth corresponding to at least one Institute of Electrical and Electronics Engineers (IEEE) 802.11 standard.

Example 41 is the computer-readable storage medium of Example 32, the wideband preamble having a designated wideband bandwidth corresponding to at least one of an Institute of Electrical and Electronics Engineers (IEEE) 802.11n standard, an IEEE 802.11g standard, an IEEE 802.11a standard, and an IEEE 802.11ac standard.

Example 42 is the computer-readable storage medium of Example 32, the wideband preamble having a designated wideband bandwidth of about 20 MHz.

Example 43 is the computer-readable storage medium of Example 32, the narrowband packet having a designated narrowband bandwidth.

Example 44 is the computer-readable storage medium of Example 32, the narrowband packet having a designated narrowband bandwidth corresponding to a long range low power (LRLP) bandwidth.

Example 45 is the computer-readable storage medium of Example 32, the narrowband packet having a designated narrowband bandwidth of about 2 MHz.

Example 46 is the computer-readable storage medium of Example 32, the instructions to cause the narrowband communication device to generate the binary-preamble packet having the wideband preamble and the narrowband packet at a same center frequency.

Example 47 is the computer-readable storage medium of Example 32, the instructions to cause the narrowband communication device to generate the binary-preamble packet having the wideband preamble and the narrowband packet at a different center frequency.

Example 48 is the computer-readable storage medium of Example 32, the wideband preamble having a duration of about 20 µs.

Example 49 is the computer-readable storage medium of Example 32, the wideband preamble having a duration of less than about 20 µs.

Example 50 is the computer-readable storage medium of Example 32, the wideband preamble comprising a preamble corresponding to at least one Institute of Electrical and Electronics Engineers (IEEE) 802.11 standard.

Example 51 is the computer-readable storage medium of Example 32, the wideband preamble comprising a preamble corresponding to at least one of an Institute of Electrical and Electronics Engineers (IEEE) 802.11n standard, an IEEE 802.11g standard, an IEEE 802.11a standard, and an IEEE 802.11ac standard.

Example 52 is the computer-readable storage medium of Example 32, the wideband preamble having a legacy short training field (L-STF), a legacy long training field (L-LTF), and a legacy signal field (L-SIG).

Example 53 is the computer-readable storage medium of Example 32, the wideband preamble comprising narrowband packet information.

Example 54 is the computer-readable storage medium of Example 53, the narrowband packet information comprising information for determining a length of the narrowband packet.

Example 55 is the computer-readable storage medium of Example 54, the narrowband packet information arranged within a length field and a modulation and code scheme (MCS) field of the wideband preamble.

Example 56 is the computer-readable storage medium of Example 32, the instructions to cause the narrowband communication device to encode at least a portion of the wideband preamble offline.

Example 57 is the computer-readable storage medium of Example 56, the instructions to cause the narrowband communication device to estimate a packet length of a wideband preamble based on a packet size type.

Example 58 is the computer-readable storage medium of Example 32, the instructions to cause the narrowband communication device to increase a clock rate of a clock circuitry to correspond to a wideband signal to generate the wideband preamble.

Example 60 is the computer-readable storage medium of Example 32, the instructions to cause the narrowband communication device to operate a clock circuitry at a clock rate corresponding to a narrowband signal to generate the narrowband packet.

Example 61 is a method for communications within a wireless narrowband network, the method comprising determining a wideband preamble, determining a narrowband packet comprising a narrowband preamble and a narrowband packet data portion, and generating a binary-preamble packet comprising the wideband preamble and the narrowband packet.

Example 62 is the method of Example 61, comprising transmitting the binary-preamble packet.

Example 63 is the method of Example 61, the narrowband communication device comprising at least one of a smart grid device, an Internet of Things (IOT) device, and a digital health sensor.

Example 64 is the method of Example 61, the narrowband communication device comprising a narrowband station.

Example 65 is the method of Example 61, the narrowband communication device comprising a narrowband access point.

Example 66 is the method of Example 61, the narrowband communication device comprising a long range low power (LRLP) device.

Example 67 is the method of Example 61, the narrowband communication device comprising a long range low power (LRLP) access point.

Example 68 is the method of Example 61, the wideband preamble having a designated wideband bandwidth.

Example 69 is the method of Example 61, the wideband preamble having a designated wideband bandwidth corresponding to at least one Institute of Electrical and Electronics Engineers (IEEE) 802.11 standard.

Example 70 is the method of Example 61, the wideband preamble having a designated wideband bandwidth corresponding to at least one of an Institute of Electrical and Electronics Engineers (IEEE) 802.11n standard, an IEEE 802.11g standard, an IEEE 802.11a standard, and an IEEE 802.11ac standard.

Example 71 is the method of Example 61, the wideband preamble having a designated wideband bandwidth of about 20 MHz.

Example 72 is the method of Example 61, the narrowband packet having a designated narrowband bandwidth.

Example 73 is the method of Example 61, the narrowband packet having a designated narrowband bandwidth corresponding to a long range low power (LRLP) bandwidth.

Example 74 is the method of Example 61, the narrowband packet having a designated narrowband bandwidth of about 2 MHz.

Example 75 is the method of Example 61, comprising generating the binary-preamble packet having the wideband preamble and the narrowband packet at a same center frequency.

Example 76 is the method of Example 61, comprising generating the binary-preamble packet having the wideband preamble and the narrowband packet at a different center frequency.

Example 77 is the method of Example 61, the wideband preamble having a duration of about 20 μs.

Example 78 is the method of Example 61, the wideband preamble having a duration of less than about 20 μs.

Example 79 is the method of Example 61, the wideband preamble comprising a preamble corresponding to at least one Institute of Electrical and Electronics Engineers (IEEE) 802.11 standard.

Example 80 is the method of Example 61, the wideband preamble comprising a preamble corresponding to at least one of an Institute of Electrical and Electronics Engineers (IEEE) 802.11n standard, an IEEE 802.11g standard, an IEEE 802.11a standard, and an IEEE 802.11ac standard.

Example 81 is the method of Example 61, the wideband preamble having a legacy short training field (L-STF), a legacy long training field (L-LTF), and a legacy signal field (L-SIG).

Example 82 is the method of Example 61, the wideband preamble comprising narrowband packet information.

Example 83 is the method of Example 82, the narrowband packet information comprising information for determining a length of the narrowband packet.

Example 84 is the method of Example 83, the narrowband packet information arranged within a length field and a modulation and code scheme (MCS) field of the wideband preamble.

Example 85 is the method of Example 61, comprising encoding at least a portion of the wideband preamble offline.

Example 86 is the method of Example 61, comprising estimating a packet length of a wideband preamble based on a packet size type.

Example 87 is the method of Example 61, the instructions to cause the narrowband communication device to increase a clock rate of a clock circuitry to correspond to a wideband signal to generate the wideband preamble.

Example 88 is the method of Example 61, the instructions to cause the narrowband communication device to operate a clock circuitry at a clock rate corresponding to a narrowband signal to generate the narrowband packet.

Example 89 is a system, comprising at least one memory, and logic, at least a portion of which is comprised in hardware coupled to the at least one memory, the logic to perform a method according to any of Examples 61-88.

Example 90 is the system of Example 89, comprising at least one radio frequency (RF) transceiver.

Example 91 is the system of Example 89, the logic comprising logic for a long range low power (LRLP) device.

Example 92 is an apparatus, comprising a wideband preamble means to determine a wideband preamble, a narrowband packet means to determine a narrowband packet comprising a narrowband preamble and a narrowband packet data portion, and a packet generator means to generate a binary-preamble packet comprising the wideband preamble and the narrowband packet.

Example 92 is the apparatus of Example 92, comprising a transceiver means to transmit the binary-preamble packet.

Example 93 is the apparatus of Example 92, the narrowband communication device comprising at least one of a smart grid device, an Internet of Things (IOT) device, and a digital health sensor.

Example 95 is the apparatus of Example 92, the narrowband communication device comprising a narrowband station.

Example 96 is the apparatus of Example 92, the narrowband communication device comprising a narrowband access point.

Example 97 is the apparatus of Example 92, the narrowband communication device comprising a long range low power (LRLP) device.

Example 98 is the apparatus of Example 92, the narrowband communication device comprising a long range low power (LRLP) access point.

Example 99 is the apparatus of Example 92, the wideband preamble having a designated wideband bandwidth.

Example 100 is the apparatus of Example 92, the wideband preamble having a designated wideband bandwidth corresponding to at least one Institute of Electrical and Electronics Engineers (IEEE) 802.11 standard.

Example 101 is the apparatus of Example 92, the wideband preamble having a designated wideband bandwidth corresponding to at least one of an Institute of Electrical and Electronics Engineers (IEEE) 802.11n standard, an IEEE 802.11g standard, an IEEE 802.11a standard, and an IEEE 802.11ac standard.

Example 102 is the apparatus of Example 92, the wideband preamble having a designated wideband bandwidth of about 20 MHz.

Example 103 is the apparatus of Example 92, the narrowband packet having a designated narrowband bandwidth.

Example 104 is the apparatus of Example 92, the narrowband packet having a designated narrowband bandwidth corresponding to a long range low power (LRLP) bandwidth.

Example 105 is the apparatus of Example 92, the narrowband packet having a designated narrowband bandwidth of about 2 MHz.

Example 106 is the apparatus of Example 92, comprising a packet generator means to generate the binary-preamble packet having the wideband preamble and the narrowband packet at a same center frequency.

Example 107 is the apparatus of Example 92, comprising a packet generator means to generate the binary-preamble packet having the wideband preamble and the narrowband packet at a different center frequency.

Example 108 is the apparatus of Example 92, the wideband preamble having a duration of about 20 µs.

Example 109 is the apparatus of Example 92, the wideband preamble having a duration of less than about 20 µs.

Example 110 is the apparatus of Example 92, the wideband preamble comprising a preamble corresponding to at least one Institute of Electrical and Electronics Engineers (IEEE) 802.11 standard.

Example 111 is the apparatus of Example 92, the wideband preamble comprising a preamble corresponding to at least one of an Institute of Electrical and Electronics Engineers (IEEE) 802.11n standard, an IEEE 802.11g standard, an IEEE 802.11a standard, and an IEEE 802.11ac standard.

Example 112 is the apparatus of Example 92, the wideband preamble having a legacy short training field (L-STF), a legacy long training field (L-LTF), and a legacy signal field (L-SIG).

Example 113 is the apparatus of Example 92, the wideband preamble comprising narrowband packet information.

Example 114 is the apparatus of Example 113, the narrowband packet information comprising information for determining a length of the narrowband packet.

Example 115 is the apparatus of Example 114, the narrowband packet information arranged within a length field and a modulation and code scheme (MCS) field of the wideband preamble.

Example 116 is the apparatus of Example 92, comprising an offline packet encoding means to encode at least a portion of the wideband preamble offline.

Example 117 is the apparatus of Example 92, comprising an offline packet encoding means to estimate a packet length of a wideband preamble based on a packet size type.

Example 118 is the apparatus of Example 92, comprising clock means for generating signals for the binary-preamble packet.

Example 119 is the apparatus of Example 118, the clock means to increase a clock rate to correspond to a wideband signal to generate the wideband preamble.

Example 120 is the apparatus of Example 118, the clock means to operate at a clock rate corresponding to a narrowband signal to generate the narrowband packet.

Example 121 is an apparatus, comprising at least one memory, and logic for a wideband communication device, at least a portion of the logic comprised in hardware coupled to the at least one memory and the at least one wireless transmitter, the logic to decode a wideband preamble of a binary-preamble packet comprising the wideband preamble and a narrowband packet, determine packet information for the narrowband packet from the wideband preamble; and generate at least one instruction for the wideband communication device to defer transmission of data based on the packet information.

Example 122 is the apparatus of Example 121, the wideband preamble having a designated wideband bandwidth.

Example 123 is the apparatus of Example 121, the wideband preamble having a designated wideband bandwidth corresponding to at least one Institute of Electrical and Electronics Engineers (IEEE) 802.11 standard.

Example 124 is the apparatus of Example im 121, the wideband preamble having a designated wideband bandwidth corresponding to at least one of an Institute of Electrical and Electronics Engineers (IEEE) 802.11n standard, an IEEE 802.11g standard, an IEEE 802.11a standard, and an IEEE 802.11ac standard.

Example 125 is the apparatus of Example 121, the wideband preamble having a designated wideband bandwidth of about 20 MHz.

Example 126 is the apparatus of Example 121, the narrowband packet having a designated narrowband bandwidth.

Example 127 is the apparatus of Example 121, the narrowband packet having a designated narrowband bandwidth corresponding to a long range low power (LRLP) bandwidth.

Example 128 is the apparatus of Example 121, the narrowband packet having a designated narrowband bandwidth of about 2 MHz.

Example 129 is the apparatus of Example 121, the wideband preamble having a duration of about 20 µs.

Example 130 is the apparatus of Example 121, the wideband preamble having a duration of less than about 20 µs.

Example 131 is the apparatus of Example 121, the wideband preamble comprising a preamble corresponding to at least one Institute of Electrical and Electronics Engineers (IEEE) 802.11 standard.

Example 132 is the apparatus of Example 121, the wideband preamble comprising a preamble corresponding to at least one of an Institute of Electrical and Electronics Engineers (IEEE) 802.11n standard, an IEEE 802.11g standard, an IEEE 802.11a standard, and an IEEE 802.11ac standard.

Example 133 is the apparatus of Example 121, the wideband preamble having a legacy short training field (L-STF), a legacy long training field (L-LTF), and a legacy signal field (L-SIG).

Example 134 is the apparatus of Example 121, the wideband preamble comprising narrowband packet information.

Example 135 is the apparatus of Example 134, the narrowband packet information comprising information for determining a length of the narrowband packet.

Example 136 is the apparatus of Example 135, the narrowband packet information arranged within a length field and a modulation and code scheme (MCS) field of the wideband preamble.

Example 137 is the apparatus of Example 121, the binary-preamble packet transmitted from a narrowband communication device.

Example 138 is the apparatus of Example 121, the binary-preamble packet transmitted from a long range low power (LRLP) device.

Example 139 is the apparatus of Example 121, the logic to determine a length of the narrowband packet based on a length field and a modulation and coding scheme (MCS) field of the wideband packet.

Example 140 is a computer-readable storage medium that stores instructions for execution by processing circuitry of a wideband communication device, the instructions to cause the wideband communication device to decode a wideband preamble of a binary-preamble packet comprising the wideband preamble and a narrowband packet, determine packet information for the narrowband packet from the wideband preamble, and generate at least one instruction for the wideband communication device to defer transmission of data based on the packet information.

Example 141 is the computer-readable storage medium of Example 140, the wideband preamble having a designated wideband bandwidth.

Example 142 is the computer-readable storage medium of Example 140, the wideband preamble having a designated wideband bandwidth corresponding to at least one Institute of Electrical and Electronics Engineers (IEEE) 802.11 standard.

Example 143 is the computer-readable storage medium of Example 140, the wideband preamble having a designated wideband bandwidth corresponding to at least one of an Institute of Electrical and Electronics Engineers (IEEE) 802.11n standard, an IEEE 802.11g standard, an IEEE 802.11a standard, and an IEEE 802.11ac standard.

Example 144 is the computer-readable storage medium of Example 140, the wideband preamble having a designated wideband bandwidth of about 20 MHz.

Example 145 is the computer-readable storage medium of Example 140, the narrowband packet having a designated narrowband bandwidth.

Example 146 is the computer-readable storage medium of Example 140, the narrowband packet having a designated narrowband bandwidth corresponding to a long range low power (LRLP) bandwidth.

Example 147 is the computer-readable storage medium of Example 140, the narrowband packet having a designated narrowband bandwidth of about 2 MHz.

Example 148 is the computer-readable storage medium of Example 140, the wideband preamble having a duration of about 20 µs.

Example 149 is the computer-readable storage medium of Example 140, the wideband preamble having a duration of less than about 20 µs.

Example 150 is the computer-readable storage medium of Example 140, the wideband preamble comprising a preamble corresponding to at least one Institute of Electrical and Electronics Engineers (IEEE) 802.11 standard.

Example 151 is the computer-readable storage medium of Example 140, the wideband preamble comprising a preamble corresponding to at least one of an Institute of Electrical and Electronics Engineers (IEEE) 802.11n standard, an IEEE 802.11g standard, an IEEE 802.11a standard, and an IEEE 802.11ac standard.

Example 152 is the computer-readable storage medium of Example 140, the wideband preamble having a legacy short training field (L-STF), a legacy long training field (L-LTF), and a legacy signal field (L-SIG).

Example 153 is the computer-readable storage medium of Example 140, the wideband preamble comprising narrowband packet information.

Example 154 is the computer-readable storage medium of Example 153, the narrowband packet information comprising information for determining a length of the narrowband packet.

Example 155 is the computer-readable storage medium of Example 154, the narrowband packet information arranged within a length field and a modulation and code scheme (MCS) field of the wideband preamble.

Example 156 is the computer-readable storage medium of Example 140, the binary-preamble packet transmitted from a narrowband communication device.

Example 157 is the computer-readable storage medium of Example 140, the binary-preamble packet transmitted from a long range low power (LRLP) device.

Example 158 is the computer-readable storage medium of Example 140, the instructions to cause the wideband communication device to determine a length of the narrowband packet based on a length field and a modulation and coding scheme (MCS) field of the wideband packet.

Example 159 is a method for communications within a wireless wideband network, the method comprising decoding a wideband preamble of a binary-preamble packet comprising the wideband preamble and a narrowband packet, determining packet information for the narrowband packet from the wideband preamble, and generating at least one instruction for the wideband communication device to defer transmission of data based on the packet information.

Example 160 is the method of Example 159, the wideband preamble having a designated wideband bandwidth.

Example 161 is the method of Example 159, the wideband preamble having a designated wideband bandwidth corresponding to at least one Institute of Electrical and Electronics Engineers (IEEE) 802.11 standard.

Example 162 is the method of Example 159, the wideband preamble having a designated wideband bandwidth corresponding to at least one of an Institute of Electrical and Electronics Engineers (IEEE) 802.11n standard, an IEEE 802.11g standard, an IEEE 802.11a standard, and an IEEE 802.11ac standard.

Example 163 is the method of Example 159, the wideband preamble having a designated wideband bandwidth of about 20 MHz.

Example 164 is the method of Example 159, the narrowband packet having a designated narrowband bandwidth.

Example 165 is the method of Example 159, the narrowband packet having a designated narrowband bandwidth corresponding to a long range low power (LRLP) bandwidth.

Example 166 is the method of Example 159, the narrowband packet having a designated narrowband bandwidth of about 2 MHz.

Example 167 is the method of Example 159, the wideband preamble having a duration of about 20 µs.

Example 168 is the method of Example m 159, the wideband preamble having a duration of less than about 20 µs.

Example 169 is the method of Example 159, the wideband preamble comprising a preamble corresponding to at least one Institute of Electrical and Electronics Engineers (IEEE) 802.11 standard.

Example 170 is the method of Example 159, the wideband preamble comprising a preamble corresponding to at least one of an Institute of Electrical and Electronics Engineers (IEEE) 802.11n standard, an IEEE 802.11g standard, an IEEE 802.11a standard, and an IEEE 802.11ac standard.

Example 171 is the method of Example 159, the wideband preamble having a legacy short training field (L-STF), a legacy long training field (L-LTF), and a legacy signal field (L-SIG).

Example 172 is the method of Example 159, the wideband preamble comprising narrowband packet information.

Example 173 is the method of Example 172, the narrowband packet information comprising information for determining a length of the narrowband packet.

Example 174 is the method of Example 173, the narrowband packet information arranged within a length field and a modulation and code scheme (MCS) field of the wideband preamble.

Example 175 is the method of Example 159, the binary-preamble packet transmitted from a narrowband communication device.

Example 176 is the method of Example 159, the binary-preamble packet transmitted from a long range low power (LRLP) device.

Example 177 is the method of Example 159, the instructions to cause the wideband communication device to determine a length of the narrowband packet based on a length field and a modulation and coding scheme (MCS) field of the wideband packet.

Example 178 is a system, comprising at least one memory, and logic, at least a portion of which is comprised in hardware coupled to the at least one memory, the logic to perform a method according to any of Examples 159-177.

Example 179 is the system of Example 178, comprising at least one radio frequency (RF) transceiver.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a clock circuitry;
   at least one memory; and
   logic for a narrowband communication device, at least a portion of the logic comprised in hardware coupled to the at least one memory and at least one wireless transmitter, the logic configured to:
   determine a first wideband preamble, of a plurality of wideband preambles, each wideband preamble of the plurality of wideband preambles comprising a pre-defined preamble having a respective legacy signal field (L-SIG) length value associated with a respective length of narrowband packets;
   determine a narrowband packet comprising a narrowband preamble and a narrowband packet data portion;
   increase a clock rate of the clock circuitry to correspond to a first wideband signal bandwidth to generate the first wideband preamble;
   decrease the clock rate of the clock circuitry to correspond to a narrowband signal bandwidth to generate the narrowband packet, the first wideband signal bandwidth greater than the narrowband signal bandwidth; and
   generate a binary-preamble packet comprising the first wideband preamble and the narrowband packet, the first wideband preamble determined based on a length of the narrowband packet and the respective length of narrowband packets associated with the L-SIG length value of the first wideband preamble.

2. The apparatus of claim 1, the logic further configured to transmit, via at least one radio frequency (RF) transceiver, the binary-preamble packet.

3. The apparatus of claim 1, the narrowband communication device comprising a long range low power (LRLP) device.

4. The apparatus of claim 1, the first wideband preamble having a designated wideband bandwidth of 20 MHz.

5. The apparatus of claim 1, the narrowband packet having a designated narrowband bandwidth of 2 MHz.

6. The apparatus of claim 1, the first wideband preamble having a duration of 20 µs.

7. The apparatus of claim 1, the L-SIG length value of the first wideband preamble comprising narrowband packet information for determining the length of the narrowband packet, the length of the narrowband packet excluding a length of the first wideband preamble, the plurality of wideband preambles comprising distinct wideband preambles.

8. The apparatus of claim 7, the logic further configured to encode at least the L-SIG length value of the first wideband preamble offline based on the plurality of wideband preambles being stored in the at least one memory, the respective length of narrowband packets of a plurality of lengths of narrowband packets.

9. The apparatus of claim 1, the logic to generate the binary-preamble packet having the first wideband preamble and the narrowband packet at a same center frequency.

10. The apparatus of claim 1, the logic to generate the binary-preamble packet having the first wideband preamble and the narrowband packet at a different center frequency.

11. The apparatus of claim 1, the first wideband preamble having a duration of less than 20 µs.

12. A non-transitory computer-readable storage medium that stores instructions for execution by processing circuitry of a narrowband communication device, the instructions executable to cause the narrowband communication device to:
determine a first wideband preamble, of a plurality of wideband preambles, each wideband preamble of the plurality of wideband preambles comprising a predefined preamble having a respective legacy signal field (L-SIG) length value associated with a respective length of narrowband packets;
determine a narrowband packet comprising a narrowband preamble and a narrowband packet data portion;
increase a clock rate of a clock circuitry to correspond to a first wideband signal bandwidth to generate the first wideband preamble;
decrease the clock rate of the clock circuitry to correspond to a narrowband signal bandwidth to generate the narrowband packet, the first wideband signal bandwidth greater than the narrowband signal bandwidth; and
generate a binary-preamble packet comprising the first wideband preamble and the narrowband packet, the first wideband preamble determined based on a length of the narrowband packet and the respective length of narrowband packets associated with the L-SIG length value of the first wideband preamble.

13. The computer-readable storage medium of claim 12, the instructions further executable to cause the narrowband communication device to transmit, via at least one radio frequency (RF) transceiver, the binary-preamble packet.

14. The computer-readable storage medium of claim 12, the first wideband preamble having a designated wideband bandwidth.

15. The computer-readable storage medium of claim 12, the narrowband packet having a designated narrowband bandwidth.

16. The computer-readable storage medium of claim 12, the instructions to cause the narrowband communication device to generate the binary-preamble packet having the first wideband preamble and the narrowband packet at a different center frequency.

17. The computer-readable storage medium of claim 12, the instructions further executable to cause the narrowband communication device to encode at least the L-SIG length value of the first wideband preamble offline based on the plurality of wideband preambles being stored in the computer-readable storage medium, the plurality of wideband preambles comprising distinct wideband preambles, the respective length of narrowband packets of a plurality of lengths of narrowband packets.

18. A method, comprising:
determining a first wideband preamble, of a plurality of wideband preambles, each wideband preamble of the plurality of wideband preambles comprising a predefined preamble having a respective legacy signal field (L-SIG) length value associated with a respective length of narrowband packets;
determining a narrowband packet comprising a narrowband preamble and a narrowband packet data portion;
increasing a clock rate of a clock circuitry to correspond to a first wideband signal bandwidth to generate the first wideband preamble;
decreasing the clock rate of the clock circuitry to correspond to a narrowband signal bandwidth to generate the narrowband packet, the first wideband signal bandwidth greater than the narrowband signal bandwidth; and
generating a binary-preamble packet comprising the first wideband preamble and the narrowband packet, the first wideband preamble determined based on a length of the narrowband packet and the respective length of narrowband packets associated with the L-SIG length value of the first wideband preamble.

19. The method of claim 18, further comprising:
transmitting, via at least one radio frequency (RF) transceiver, the binary-preamble packet.

20. The method of claim 18, the first wideband preamble having a designated wideband bandwidth.

21. The method of claim 18, the narrowband packet having a designated narrowband bandwidth.

22. The method of claim 18, further comprising:
generating the binary-preamble packet having the first wideband preamble and the narrowband packet at a different center frequency.

* * * * *